(12) United States Patent
Van Paridon et al.

(10) Patent No.: US 8,999,867 B2
(45) Date of Patent: Apr. 7, 2015

(54) MELT BLOWN FIBER

(75) Inventors: Henk Van Paridon, Averbode (BE);
Bert Broeders, Beringen (BE);
Wilhelmus henricus Adolf Sars, Tilburg (NL); Joachim Fiebig, St. Marien (AT);
Nina Ackermans, Tessenderlo (BE)

(73) Assignee: Borealis AG, Vienna (AT)

( * ) Notice: Subject to any disclaimer, the term of this patent is extended or adjusted under 35 U.S.C. 154(b) by 309 days.

(21) Appl. No.: 13/575,469

(22) PCT Filed: Jan. 19, 2011

(86) PCT No.: PCT/EP2011/050676
§ 371 (c)(1),
(2), (4) Date: Oct. 16, 2012

(87) PCT Pub. No.: WO2011/092092
PCT Pub. Date: Aug. 4, 2011

(65) Prior Publication Data
US 2013/0137329 A1 May 30, 2013

(30) Foreign Application Priority Data

Jan. 28, 2010 (EP) .................................... 10151898

(51) Int. Cl.
*D04H 1/56* (2006.01)
*D04H 3/00* (2012.01)
(Continued)

(52) U.S. Cl.
CPC ................ *D01F 6/30* (2013.01); *D01D 5/0985* (2013.01);
(Continued)

(58) Field of Classification Search
CPC .......... D01D 5/0985; D01F 6/30; D04H 1/56;
D04H 3/007; D04H 3/16; C08F 210/06;
C08F 210/16; C08F 2500/12
USPC ............... 442/351, 400; 428/401; 264/172.17
See application file for complete search history.

(56) References Cited

U.S. PATENT DOCUMENTS 5,234,879 A 8/1993 Garoff et al.
(Continued)

FOREIGN PATENT DOCUMENTS

EP 0629632 A2 12/1994
(Continued)

OTHER PUBLICATIONS

International Search Report and Written Opinion for European International Application No. PCT/EP2011/050676 Filed Jan. 19, 2011.
(Continued)

*Primary Examiner* — Jeremy R Pierce
(74) *Attorney, Agent, or Firm* — Warn Partners, P.C.

(57) ABSTRACT

Melt-blown fiber having an average diameter of not more than 5.0 μm, said fiber comprises at least 85 wt.-% of a propylene copolymer, wherein •said melt blown fiber and/or said propylene copolymer has/have a melt flow rate $MFR_2$ (230° C.) measured according to ISO 1133 of at least 200 g/10 min, •said propylene copolymer has a comonomer content of 0.5 to 5.5 wt.-%, the comonmers are ethylene and/or at least one $C_4$ to $C_{20}$ α-olefin selected from the group consisting of 1-butene, 1-pentene, 1-hexene, 1-heptene, and 1-octene, •the propylene copolymer has <2,1> regiodefects of not more than 0.4 mol.-% determined by $^{13}$C-spectroscopy, and •said melt blown fiber and/or said propylene copolymer fulfill(s) the equation (1). wherein Tm [° C.] is the melting temperature [given in ° C.] of melt blown fiber said and/or of said propylene copolymer measured according to ISO 11357-3, C2 [wt %] is the amount [given in weight percentage] of comonomers within said melt blown fiber and/or within said propylene copolymer determined with Fourier transform infrared spectroscopy (FTIR).

$$\frac{Tm[° C.]}{[° C.]} \geq 160 - \frac{C2[wt \%] \times 5.25}{[wt \%]} \quad (1)$$

18 Claims, 2 Drawing Sheets

Tensile properties of Inventive Example measured directly (1 hour) after preparation of the melt blown web; effect of processing conditions (51) Int. Cl.

| | | |
|---|---|---|
| *D02G 3/00* | (2006.01) | |
| *D01D 5/08* | (2006.01) | |
| *D01F 6/30* | (2006.01) | |
| *D01D 5/098* | (2006.01) | |
| *D04H 3/007* | (2012.01) | |
| *D04H 3/16* | (2006.01) | |
| *C08F 210/06* | (2006.01) | |

(52) U.S. Cl.
CPC ............... *D04H 1/56* (2013.01); *D04H 3/007* (2013.01); *D04H 3/16* (2013.01); *C08F 210/06* (2013.01)

(56) References Cited

U.S. PATENT DOCUMENTS

| | | | |
|---|---|---|---|
| 6,423,800 B1* | 7/2002 | Musgrave ..................... | 526/227 |
| 6,960,635 B2* | 11/2005 | Stevens et al. ................ | 526/161 |
| 2003/0109412 A1* | 6/2003 | Alastalo et al. ............... | 510/475 |
| 2003/0236378 A1* | 12/2003 | Ozdemir et al. ............ | 526/348.1 |
| 2005/0130544 A1* | 6/2005 | Cheng et al. .................. | 442/415 |
| 2012/0116338 A1* | 5/2012 | Ferry et al. .................... | 442/334 |
| 2012/0123374 A1* | 5/2012 | Richeson et al. ............. | 442/328 |

FOREIGN PATENT DOCUMENTS

| | | | |
|---|---|---|---|
| EP | 0887379 | A1 | 12/1998 |
| KR | 1020100074339 | A | 1/2010 |
| WO | 9212182 | A1 | 7/1992 |
| WO | 9219653 | A1 | 11/1992 |
| WO | 9933843 | A1 | 7/1999 |
| WO | 2007024447 | A1 | 3/2007 |
| WO | 2007045600 | A1 | 4/2007 |
| WO | 2009026207 | A1 | 2/2009 |

OTHER PUBLICATIONS

P.Viville, et al., Characterization of the molecular structure of two highly isotactic polypropylenes, Polymer, 2001, pp. 1953-1967, vol. 42, Elsevier Science Ltd.

C.H. Stephens, et al., Comparison of Propylene/Ethylene Copolymers Prepared with Different Catalysts, Journal of Applied Polymer Science, 2006, pp. 1651-1658, vol. 100, Wiley Periodicals, Inc.

Antti Tynys, et al., Propylene Polymerisations with novel heterogeneous combination metallocene catalyst systems, Polymer, 2007, pp. 1893-1902, vol. 48, Elsevier Ltd.

Claudio De Rosa, Finizia Auriemma, Odda Ruiz De Ballesteros, Luigi Resconi & Isabella Camurati, Tailoring the Physical Properties of Isotactic Polypropylene through Incorporation of Comonomers and the Precise Control of Stereo- and Regioregularity by Metallocene Catalysts, Chemical of Materials, 2007, pp. 5122-5130, vol. 19, American Chemical Society.

Mario Hoyos, Pilar Tiemblo & Jose Manuel Gomez-Elvira, Effect of microstructure on the thermo-oxidation of solid isotactic polypropylene-based polyolefins, Science and Technology of Advance materials, 2008, pp. 1-13, vol. 9, National Institute for Materials in UK.

Stefan Berger & Siegmar Braun, 200 and More NMR Experiments, 2004, Wiley-VCH Verlag GmbH & Co. KGaA, Winheim.

\* cited by examiner

Figure 1: Tensile properties of Inventive Example measured directly (1 hour) after preparation of the melt blown web; effect of processing conditions Figure 2: Tensile properties of Inventive and Comparative Examples prepared at "high air flow" conditions measured directly (1 hour) after preparation of the melt blown web and after conditioning (1 week); inventive effect of comonomer

MELT BLOWN FIBER

CROSS REFERENCE TO RELATED APPLICATIONS

This application is a National Stage of International Application No. PCT/EP2011/050676, filed Jan. 19, 2011. This application claims priority to European Patent Application No. 10151898.3 filed on Jan. 28, 2010. The disclosures of the above applications are incorporated herein by reference.

The present invention is directed to a new melt blown web based on melt blown fibers comprising a propylene copolymer and to articles made therefrom.

A melt blown web, being a non-woven structure consisting of melt blown fibers, is typically made in a one-step process in which high-velocity air blows a molten thermoplastic resin from an extruder die tip onto a conveyor or take-up screen to form fine fibered self-bonding web. Although many types of polymers can be employed for melt blown fibers and fabrics, polypropylene is one of the most commonly used polymers. Normally for the manufacture of melt blown fibers and webs very low viscosity polypropylene homopolymers are used. However such polymers suffer from limited mechanical strength. To overcome this problem spunbonded fabrics are produced. The polypropylene fibers of the spunbonded fabrics are much thicker compared to melt blown fibers and thus the overall weight of a spunponded fabric is much higher compared to a melt blown web. A further characterizing and distinguishing feature of melt blown webs are their excellent water barrier and filtration properties not achievable with spunbonded fabrics.

Thus the object of the present invention is to provide a fiber and/or a non-woven web with excellent mechanical strength, in particular excellent mechanical strength in terms of elongation at break, without losing other essential properties, like excellent barrier properties and low weights, of the web.

The finding of the present invention is to provide a melt blown web and/or fiber based on a propylene copolymer with a comonomer content not exceeding 5.5 wt.-%.

Thus the present invention is directed to a melt-blown fiber having an average diameter of not more than 5.0 µm, preferably below 5.0 µm, said fiber comprises a propylene copolymer, wherein (a) said melt blown fiber and/or said propylene copolymer has/have a melt flow rate MFR$_2$ (230° C.) measured according to ISO 1133 of at least 200 g/10 min,
(b) said propylene copolymer has a comonomer content of 0.5 to 5.5 wt.-%, the comonmers are ethylene and/or at least one C$_4$ to C$_{20}$ α-olefin,
(c) the propylene copolymer has <2,1> regiodefects of not more than 0.4 mol.-% determined by $^{13}$C-spectroscopy, and
(d) said melt blown fiber and/or said propylene copolymer fulfill(s) the equation (1)

$$\frac{Tm[°\,C.]}{[°\,C.]} \geq 160 - \frac{C2[wt\,\%] \times 5.25}{[wt\,\%]} \quad (1)$$

wherein
Tm [° C.] is the melting temperature [given in ° C.] of said melt blown fiber and/or of said propylene copolymer measured according to ISO 11357-3,
C2 [wt %] is the amount [given in weight percentage] of comonomers, preferably of ethylene, within said melt blown fiber and/or within said propylene copolymer, preferably within said propylene copolymer, determined with Fourier transform infrared spectroscopy (FTIR).

Figure 1:
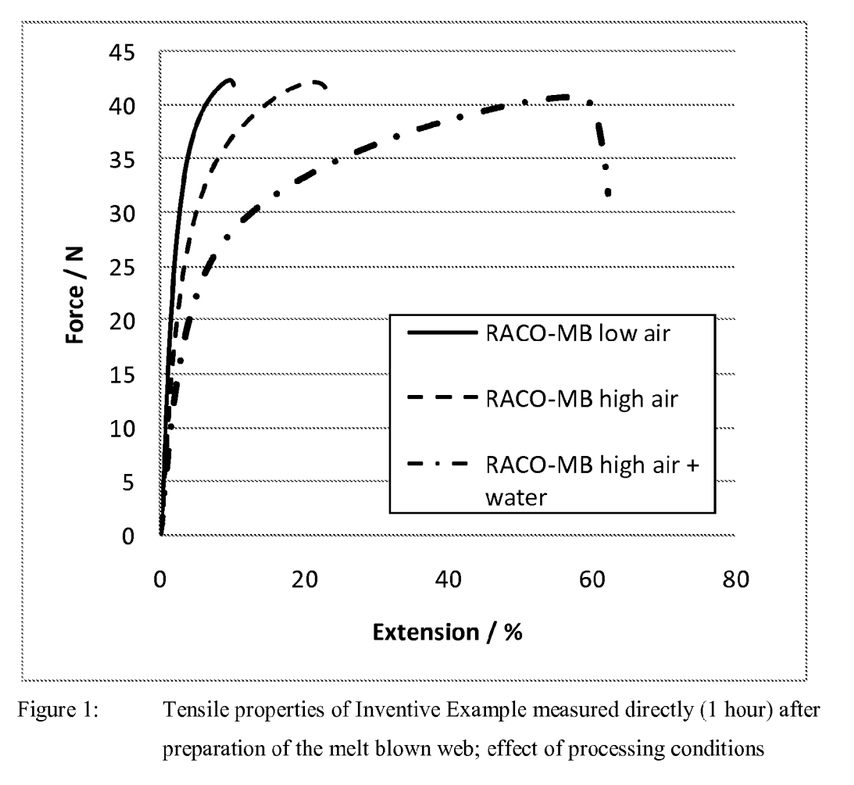
FIG. 1 is a chart depicting tensile properties of an inventive example directly (one hour) after preparation of the melt blown web illustrating the effect of processing conditions.
Figure 2:
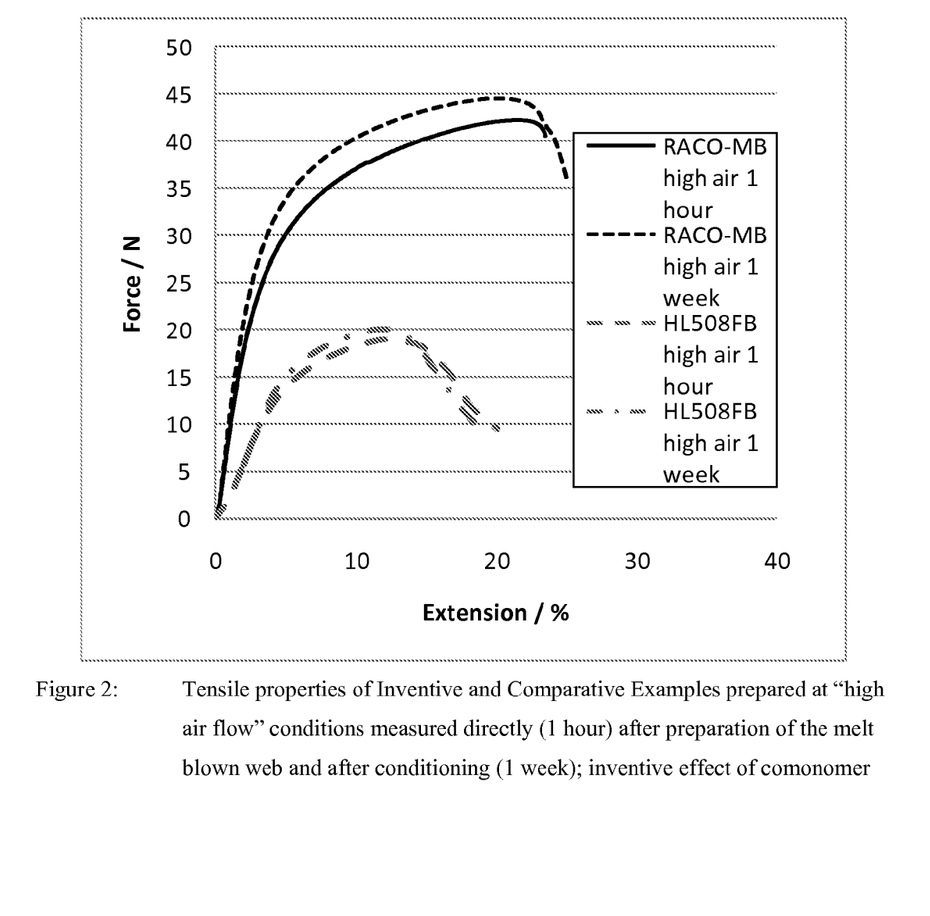
FIG. 2 is a chart depicting tensile properties of inventive and comparative examples prepared at "high air flow" conditions measured directly (one hour) after preparation of the melt blown web and after conditioning (one week) illustrating the inventive effect of comonomer.

Surprisingly it has been found out that such a melt blown fiber and/or the web made thereof has/have much better mechanical strength, in particular mechanical strength in terms of elongation at break, compared to known melt blown fibers and webs, respectively (see FIGS. 1 to 2). The better performance is in particular pronounced in case the mechanical properties are measured after an aging process of one week.

In the following the melt blown fibers according to the instant invention is defined in more detail.

One essential requirement is that the inventive fiber is a melt blown fiber. Melt blown fibers differ essentially from other fibers, in particular from those produced by spunbond technique. In the melt blowing process a gas stream of high velocity impinges on the molten polymer stream as the polymer extrudes from small capillary in the melt blowing die and rapidly attenuates the polymer filament from about 500 µm diameter at the capillary down to diameters below 5.0 µm, like down to diameters below 3.0 µm. This corresponds to a reduction of 500 times in fiber diameter and 2,500,000 times in cross sectional area. The process occurs in about 200 microseconds over a distance of a few centimeters. This amounts to 6 times more surface area and 36 times more fiber in a melt blown web of 1 to 3 µm compared to an equivalent fiber web produced by carded or spunbond technique. Thus the principal advantage of the melt blown process is that one can make very fine fibers and very lightweight melt blown webs with excellent uniformity. The result is a soft melt blown web with excellent barrier properties, meaning effective filtration characteristics and resistance to penetration by aqueous liquids. In other words the process features "melt blown" distinguishes such produced fibers from fibers produced by different technology. More precisely "melt blown fibers" are very thin having diameters not accomplished with other fiber processes. Further webs made out of such melt blown fibers are softer and have lower weight compared to webs of the same thickness but produced by other technologies, like the spunbond process.

Accordingly the melt blown fiber according to the present invention has an (average) diameter measured of not more than 5.0 µm, like below 5.0 µm, preferably of not more than 3.0 µm. It is in particular appreciated that the (average) diameter of the melt blown fiber is in the range of 0.1 to 5.0 µm, like 0.1 to below 5.0 µm, more preferably in the range of 0.5 to 4.9 µm, yet more preferably in the range of 0.5 to 3.0 µm, like 1.0 to 3.0 µm.

A further requirement of the present invention is that the melt blown fiber comprises a propylene copolymer. Preferably the melt blown fiber comprises at least 85 wt.-%, more preferably at least 90 wt.-%, like at least 95 wt.-%, of the propylene copolymer. Accordingly it is in particular appreciated that the melt blown fiber may comprise in addition to the propylene copolymer typical additives, like antioxidants stabilizers, fillers, colorants, nucleating agents and mold release agents. Primary and secondary antioxidants include, for example, hindered phenols, hindered amines, and phosphates. Nucleating agents include, for example, sodium benzoate, sorbitol derivatives like bis-(3,4-dimethylbenzylidene) s-orbitol and nonitol derivatives like 1,2,3-trideoxy-4,6:5,7-bis-O[(4-propylphenyl)methylene]-nonitol. Other additives such as dispersing agents like glycerol monostearate can also be included. Slip agents include, for example, oleamide and erucamide. Catalyst deactivators are also commonly used, for example, calcium stearate, hydrotalcite, and calcium oxide, and/or other acid neutralizers known in the art. The amount of such additives however shall preferably not exceed 10 wt.-%, more preferably not more than 5 wt.-%, base on the melt blown fiber and/or web comprising the melt blown fiber. Accordingly in a specific embodiment the melt blown fiber and/or the web comprising the melt blown fiber may contain additives, in particular those as stated in this paragraph, but no other polymers. Thus it is preferred that the propylene copolymer is the only polymer within the melt blown fiber and/or web comprising the melt blown fiber.

In the following the propylene copolymer is described in more detail.

A "comonomer" according to this invention is a polymerizable unit different to propylene. Accordingly the propylene copolymer according to this invention shall have a comonomer content of 0.5 to 5.5 wt.-%, preferably of 0.5 to 5.0 wt.-%, more preferably of 0.5 to 4.5 wt.-%, yet more preferably of 1.0 to 4.0 wt.-%, like 1.0 to 3.5 wt.-%. The remaining part constitutes units derivable from propylene. Accordingly the propylene content in the propylene copolymer is preferably at least 94.0 wt.-%, more preferably at least 94.5 wt.-%, yet more preferably in the range of 94.5 to 99.5 wt.-%, still more preferably 95.0 to 99.5 wt.-%, still yet more preferably 95.5 to 99.5 wt.-%, like 96.0 to 99.0 wt.-% or like 96.5 to 99.0 wt-%.

The comonomers of the propylene copolymer are ethylene and/or at least one $C_4$ to $C_{20}$ α-olefins, more preferably the comonomers of the propylene copolymer are selected from the group consisting of ethylene, $C_4$ α-olefin, $C_5$ α-olefin, $C_6$ α-olefin, $C_7$ α-olefin, $C_8$ α-olefin, $C_9$ α-olefin, and $C_{10}$ α-olefin, still more preferably the comonomers of the propylene copolymer are selected from the group consisting of ethylene, 1-butene, 1-pentene, 1-hexene, 1-heptene, 1-octene, 1-nonene and 1-decene, wherein ethylene, 1-butene and 1-hexene are preferred. The propylene copolymer may contain more than one type of comonomer. Thus the propylene copolymer of the present invention may contain one, two or three different comonomers. However it is preferred that the propylene copolymer contains only one type of comonomer. Preferably the propylene copolymer comprises—apart from propylene—only ethylene, 1-butene, or 1-hexene. In an especially preferred embodiment the comonomer of the propylene copolymer is only ethylene.

Thus the propylene copolymer is in a preferred embodiment a propylene copolymer of propylene and ethylene only, wherein the ethylene content is in the range of 0.5 to 5.5 wt.-%, preferably in the range of 0.5 to 4.5 wt.-%, more preferably in the range of 1.0 to 4.0 wt.-%, like in the range of 1.0 to 3.5 wt.-%.

Further it is appreciated that the xylene soluble content of the propylene copolymer and/or of the melt blown fiber, preferably of the propylene copolymer, is a rather low. Accordingly the propylene copolymer and/or the melt blown fiber, preferably the propylene copolymer, has a xylene cold soluble fraction (XCS) measured according to ISO 6427 (23° C.) of not more than 12.0 wt-%, more preferably of not more than 10.0 wt.-%, yet more preferably of not more than 9.5 wt.-%, like not more than 9.0 wt.-%. Thus a preferred range is 1.0 to 12.0 wt.-%, more preferred 1.5 to 10.0 wt.-%, still more preferred 2.0 to 9.0 wt.-%.

A further characteristic of the propylene copolymer is the low amount of missinsertions of propylene within the polymer chain. Accordingly the propylene copolymer is featured by low amount of <2,1> regiodefects, i.e. of not more than 0.4 mol.-%, more preferably of not more than 0.2 mol.-%, like of not more than 0.1 mol.-%, determined by $^{13}$C-NMR spectroscopy.

Additionally it is appreciated that the propylene copolymer and/or the melt blown fiber has/have a heat of fusion (Hm) of at least 80 J/g, more preferably of at least 90 J/g, still more preferably in the range of 85 to 110 J/g, yet more preferably in the range of 90 to 105 J/g.

Further it is preferred that the propylene copolymer and/or the melt blown fiber has/have a crystallinity of at least of 35%, more preferably in the range of 40 to 55%.

Preferably the random propylene copolymer is isotactic. Accordingly it is appreciated that the propylene copolymer has a rather high pentad concentration, i.e. higher than 95 mol-%, more preferably higher than 97 mol-%, still more preferably higher than 98 mol-%.

Further it is appreciated that the comonomers within the propylene copolymer are randomly distributed. The randomness indicates the amount of isolated comonomer units, i.e. those which have no other comonomer units in the neighbour, compared to the total amount of comonomers in the polymer chain. In a preferred embodiment, the randomness of the propylene copolymer is at least 30%, more preferably at least 50%, even more preferably at least 60%, and still more preferably at least 65%.

As stated above the propylene copolymer is preferably the only polymer component within the melt blown fiber. Accordingly the term "propylene copolymer" according to this invention does not encompass heterophasic systems comprising a polypropylene and dispersed therein an elastomeric component. In fact the propylene copolymer according to this invention shall preferably not be understood as a mixture of two different polymers being not miscible. The term being "not miscible" indicates polymer mixtures wherein the different polymers due to their different nature form distinguishable phases visible by high resolution microscopy, like electron microscopy or scanning force microscopy. However this does not exclude the option that the propylene copolymer is a so called bimodal or multimodal polymer. Different to non miscible polymers, bimodal or multimodal polymers comprise fractions which differ in their molecular weight distribution and/or their comonomer content distribution but nevertheless are miscible in the meaning of the invention.

Thus expression "multimodal" or "bimodal" used herein refers to the modality of the polymer, i.e. the form of its comonomer content distribution curve, which is the graph of the comonomer content as a function of elution temperature of the temperature rising elution fractionation (TREF) method. The temperature rising elution fractionation (TREF) technique fractionates propylene polymers according to the longest crystallizable sequences in the chain, which increases almost linearly with the elution temperature (P. Ville et al., Polymer 42 (2001) 1953-1967). Hence the higher the maximum temperature the longer are the isotactic sequences. Further the temperature rising elution fraction (TREF) technique does not strictly fractionate polypropylene according to tacticity but according to the longest crystallizable sequences in the chain. Hence the solubility of the propylene copolymer chain is influenced by the concentration and distribution of sterical defects. Insofar the temperature rising elution fraction (TREF) technique is an appropriate method to characterize the propylene copolymer in view of its comonomer distribution further.

As will be explained below the propylene copolymer can be produced by blending different polymer types, i.e. of comonomer content. However it is preferred that the polymer components of the propylene copolymer are produced in a sequential step process, using reactors in serial configuration and operating at different reaction conditions. As a consequence, each fraction prepared in a specific reactor will have its own comonomer content distribution.

When the distribution curves from these fractions are superimposed to obtain the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

Accordingly the propylene copolymer according to this invention may be bimodal or multimodal but not a mixture of non-miscible polymers (polymer fractions). Thus in one embodiment the propylene copolymer is multimodal, like bimodal, in view of the comonomer content. In another preferred embodiment the propylene copolymer is unimodal in view of the comonomer distribution.

A further important feature of the propylene copolymer is the dependency of the melting temperature on the comonomer, in particular ethylene, content within the propylene copolymer. It is known that with increase of comonomer, in particular with increase of ethylene, the melting temperature decreases. However to obtain the desired properties of the present invention the melting temperature and the comonomer content, i.e. ethylene content, must comply a specific relationship. Thus it is preferred that the propylene copolymer and/or the melt blown fiber according to the instant invention fulfills the equation (1), more preferably the equation (1a), yet more preferably the equation (1b), $$\frac{Tm[°C.]}{[°C.]} \geq 160 - \frac{C2[wt\%] \times 5.25}{[wt\%]} \quad (1)$$

$$\frac{Tm[°C.]}{[°C.]} \geq 161 - \frac{C2[wt\%] \times 5.25}{[wt\%]} \quad (1a)$$

$$\frac{Tm[°C.]}{[°C.]} \geq 162 - \frac{C2[wt\%] \times 5.25}{[wt\%]} \quad (1b)$$

wherein

Tm [° C.] is the melting temperature [given in ° C.] of melt blown fiber said and/or of said propylene copolymer, preferably of said propylene copolymer, measured according to ISO 11357-3, C2 [wt %] is the amount [given in weight percentage] of comonomers, preferably of ethylene, within said melt blown fiber and/or within said propylene copolymer, preferably within said propylene copolymer, determined with Fourier transform infrared spectroscopy (FTIR).

Further it is appreciated that the propylene copolymer and/or the melt blown fiber according to this invention has/have a melting temperature Tm measured according to ISO 11357-3 of at least 130° C., preferably at least 135° C., more preferably at least 137° C., like of at least 140° C. Accordingly the melting temperature ranges preferably from 130 to 157° C., more preferably ranges from 135 to 155° C.

A further mandatory requirement of the propylene copolymer and/or of the melt blown fiber is its rather high melt flow rate, which differ(s) form other polymers and/or fibers obtained by spunbond technique. The melt flow rate mainly depends on the average molecular weight. This is due to the fact that long molecules render the material a lower flow tendency than short molecules. An increase in molecular weight means a decrease in the MFR-value. The melt flow rate (MFR) is measured in g/10 min of the polymer discharged through a defined die under specified temperature and pressure conditions and the measure of viscosity of the polymer which, in turn, for each type of polymer is mainly influenced by its molecular weight but also by its degree of branching. The melt flow rate measured under a load of 2.16 kg at 230° C. (ISO 1133) is denoted as $MFR_2$ (230° C.). Accordingly, one requirement of the present invention is that the propylene copolymer and/or the melt blown fiber has/have an $MFR_2$ (230° C.) of at least 200 g/10 min, preferably of at least 400 g/10 min, more preferably in the range of in a range of 200 to 3,000 g/10 min, yet more preferably in the range of 400 to 2,000 g/10 min.

A propylene copolymer with such high melt flow rate is preferably obtained by vis-breaking. Accordingly it is appreciated that the propylene copolymer according to this invention is obtained by visbreaking a propylene polymer with the same properties as indicated in the instant invention but with a lower melt flow rate ($MFR_2$). Thus it is preferred that the propylene copolymer before visbreaking has an $MFR_2$ (230° C.) of not more than 150 g/10 min, more preferably in the range of 15 to 120 g/10 min, yet more preferably in the range of 20 to 100 g/10 min Preferably the initially used propylene copolymer is chosen in such a manner that the visbreaking ratio [final $MFR_2$ (230° C.)/initial $MFR_2$ (230° C.)] is 5.0 to 100.0, more preferably 10.0 to 80.0, most preferably 15.0 to 60.0, wherein "initial $MFR_2$ (230° C.)" is the $MFR_2$ (230° C.) of the propylene copolymer before visbreaking and "final $MFR_2$ (230° C.)" is the $MFR_2$ (230° C.) of the propylene copolymer (R—PP) after visbreaking.

Of course the present propylene copolymer is further featured by a rather narrow molecular weight distribution as the polymer has been preferably visbroken. Visbreaking of polymers not only increases the melt flow rate but additionally narrows the molecular weight distribution. Accordingly it is appreciated that the molecular weight distribution ($M_w/M_n$) of the propylene copolymer and/or of the melt blown fiber is in the range of 2.0 to 6.0, more preferably in the range of 2.5 to 4.5.

Further the fiber and/or the melt blown web made from the fiber is featured by a specific relationship of tensile modulus to comonomer content within the propylene copolymer and/or fiber. Thus it is preferred that the propylene copolymer and/or the melt blown fiber fulfill(s) the equation (2), more preferably the equation (2a), $$\frac{TM[MPa]}{[MPa]} \geq 1200 - \frac{C2[wt\%] \times 145}{[wt\%]} \quad (2)$$

$$\frac{TM[MPa]}{[MPa]} \geq 1250 - \frac{C2[wt\%] \times 145}{[wt\%]} \quad (2a)$$

wherein

TM [MPa] is the tensile modulus [given in MPa] of said melt blown fiber and/or of said propylene copolymer, preferably within said propylene copolymer, measured according to ISO 527-3 using injection molded specimen as described in EN ISO 1873-2 (dog bone shape, 4 mm thickness), C2 [wt %] is the amount [given in weight percentage] of comonomers, preferably of ethylene, within said melt blown fiber and/or within said propylene copolymer, preferably within said propylene copolymer, determined with Fourier transform infrared spectroscopy (FTIR).

The present invention is not only directed to the melt blown fibers as such but also to articles, like webs, made thereof. Accordingly the present invention is directed to articles comprising the melt blown fibers of the present invention, like filtration medium (filter), diaper, sanitary napkin, panty liner, incontinence product for adults, protective clothing, surgical drape, surgical gown, and surgical wear. In particular the present invention is directed to a melt blown web comprising melt blown fibers of the instant invention.

Preferably the melt blown web according to the instant invention has a tensile strength
(a) of at least 35 N, more preferably of at least 38 N, measured 1 h after production of the melt blown web according to ISO 527-1 on rectangular specimens cut from the web having 50 mm width and 140 mm length at a temperature of +23±2° C. and a testing speed of 100 mm/min and/or
(b) of at least 36 N, more preferably of at least 40 N, measured 168 h after production of the melt blown web according to ISO 527-1 on rectangular specimens cut from the web having 50 mm width and 140 mm length.

Additionally the present invention claims articles selected from the group consisting of filtration medium (filter), diaper, sanitary napkin, panty liner, incontinence product for adults, protective clothing, surgical drape, surgical gown, and surgical wear, comprising a melt blown web comprising the melt blown fibers of the present invention. The articles of the present invention may comprise in addition to the melt blown web a spunbonded fabric known in the art.

In the following the preparation of the melt blown fiber and/or web is described in more detail.

The propylene copolymer as defined in the instant invention may be prepared by polymerizing, in a slurry reactor, for example a loop reactor, propylene optionally together with at least another $C_2$ to $C_{20}$ α-olefin (comonomers), in the presence of a polymerization catalyst to produce a part of the propylene copolymer. This part is then transferred to a subsequent gas phase reactor, whereupon in the gas phase reactor propylene is reacted in the presence of suitably selected other $C_2$ to $C_{20}$ α-olefin(s) (comonomers) in order to produce a further part in the presence of the reaction product of the first step. This reaction sequence provides a reactor blend of parts (i) and (ii) constituting the propylene copolymer. It is of course possible by the present invention that the first reaction is carried out in a gas phase reactor while the second polymerization reaction is carried out in a slurry reactor, for example a loop reactor. It is furthermore also possible to reverse the order of producing parts (i) and (ii), which has been described above in the order of first producing part (i) and then producing part (ii). The above-discussed process, comprising at least two polymerization steps, is advantageous in view of the fact that it provides easily controllable reaction steps enabling the preparation of a desired reactor blend. The polymerization steps may be adjusted, for example by appropriately selecting monomer feed, comonomer feed, hydrogen feed, temperature and pressure in order to suitably adjust the properties of the polymerization products obtained. It is in particular possible to obtain a multimodality, preferably the bimodality, of the propylene copolymer, with respect to the comonomer, like ethylene, distribution as well as with respect to the molecular weights and $MFR_2$ (230° C.) values during said multistage polymerization procedures.

Such a process can be carried out using any suitable catalyst for the preparation of the propylene copolymer. Preferably, the process as discussed above is carried out using a Ziegler-Natta catalyst, in particular a high yield Ziegler-Natta catalyst (so-called fourth and fifth generation type to differentiate from low yield, so called second generation Ziegler-Natta catalysts). A suitable Ziegler-Natta catalyst to be employed in accordance with the present invention comprises a catalyst component, a co-catalyst component and at least one electron donor (internal and/or external electron donor, preferably at least one external donor). Preferably, the catalyst component is a Ti—Mg-based catalyst component and typically the co-catalyst is an Al-alkyl based compound. Suitable catalysts are in particular disclosed in U.S. Pat. No. 5,234,879, WO 92/19653, WO 92/19658 and WO 99/33843.

Preferred external donors are the known silane-based donors, such as dicyclopentyl dimethoxy silane or cyclohexyl methyldimethoxy silane.

One embodiment of a process as discussed above is a loop-gas phase process, such as developed by Borealis, known as Borstar® technology, described for example in EP 0 887 379 A1 and WO 92/12182.

With respect to the above-mentioned preferred slurry-gas phase process, the following general information can be provided with respect to the process conditions.

Temperature of from 40 to 110° C., preferably between 60 and 100° C., in particular between 80 and 90° C., with a pressure in the range of from 20 to 80 bar, preferably 30 to 60 bar, with the option of adding hydrogen in order to control the molecular weight. The reaction product of the slurry polymerization, which preferably is carried out in a loop reactor, is then transferred to the subsequent gas phase reactor, wherein the temperature preferably is within the range of from 50 to 130° C., more preferably 80 to 100° C., at a pressure in the range of from 5 to 50 bar, preferably 15 to 35 bar, again with the option of adding hydrogen in order to control the molecular weight.

The residence time can vary in the reactor zones identified above. In embodiments, the residence time in the slurry reaction, for example the loop reactor, is in the range of from 0.5 to 5 hours, for example 0.5 to 2 hours, while the residence time in the gas phase reactor generally will be from 1 to 8 hours.

The properties of the propylene copolymer produced with the above-outlined process may be adjusted and controlled with the process conditions as known to the skilled person, for example by one or more of the following process parameters: temperature, hydrogen feed, comonomer feed, propylene feed, catalyst, type and amount of external donor, split between two or more components of a multimodal polymer.

In case the propylene copolymer is subjected a visbreaking step, the visbreaking may be carried out in any known manner, like by using a peroxide visbreaking agent. Typical visbreaking agents are 2,5-dimethyl-2,5-bis(tert.butyl-peroxy) hexane (DHBP) (for instance sold under the tradenames Luperox 101 and Trigonox 101), 2,5-dimethyl-2,5-bis(tert. butyl-peroxy)hexyne-3 (DYBP) (for instance sold under the tradenames Luperox 130 and Trigonox 145), dicumyl-peroxide (DCUP) (for instance sold under the tradenames Luperox DC and Perkadox BC), di-tert.butyl-peroxide (DTBP) (for instance sold under the tradenames Trigonox B and Luperox Di), tert.butyl-cumyl-peroxide (BCUP) (for instance sold under the tradenames Trigonox T and Luperox 801) and bis(tert.butylperoxy-isopropyl)benzene (DIPP) (for instance sold under the tradenames Perkadox 14S and Luperox DC). Suitable amounts of peroxide to be employed in accordance with the present invention are in principle known to the skilled person and can easily be calculated on the basis of the amount of propylene copolymer to be subjected to visbreaking, the MFR$_2$ (230° C.) value of the propylene copolymer to be subjected to visbreaking and the desired target MFR$_2$ (230° C.) of the product to be obtained. Accordingly, typical amounts of peroxide visbreaking agent are from 0.005 to 0.5 wt.-%, more preferably from 0.01 to 0.2 wt.-%, based on the amount of propylene copolymer employed.

Typically, visbreaking in accordance with the present invention is carried out in an extruder, so that under the suitable conditions, an increase of melt flow rate is obtained. During visbreaking, higher molar mass chains of the starting product are broken statistically more frequently than lower molar mass molecules, resulting as indicated above in an overall decrease of the average molecular weight and an increase in melt flow rate.

The thus obtained propylene polymer is used in pellet or granule form for the melt blown fiber process. In the process metering pumps are used to pump the molten propylene copolymer to a distribution system having a series of die tips, the propylene copolymer being in the molten state at some processing temperature. The die tip is designed in such a way that the holes are in a straight line with high-velocity air impinging from each side. A typical die will have 0.3 to 0.5 mm diameter, preferably 0.4 mm diameter, holes spaced at 10 to 16 per cm (25 to 40 per inch). The impinging high-velocity hot air attenuates the filaments and forms the desired fibers Immediately below or adjacent to the die, a large amount of ambient air is drawn into the hot air stream containing the fibers which cools the hot gas and solidifies the fibers onto a forming belt or other solid surface that is typically moving in such a manner as to create a continually renewed surface for the fibers to contact and form a web. The processing temperature is one factor in the final web properties. The "optimal" processing temperature is one at which ideal properties of the web are achieved such as low shot with good hand and high barrier properties, or good filtration properties.

The properties of the melt blown fiber and/or the melt blown web can be significantly improved in case the cooling of the fibers is not accomplished with ambient air but by water cooling. Thus in one specific embodiment the melt blown fiber according to the present invention has been cooled by water quenching.

The present invention will now be described in further detail by the examples provided below.

EXAMPLES

1. Definitions/Measuring Methods

The following definitions of terms and determination methods apply for the above general description of the invention as well as to the below examples unless otherwise defined.

Quantification of Isotacticity in Polypropylene by $^{13}$C NMR Spectroscopy

The isotacticity is determined by quantitative $^{13}$C nuclear magnetic resonance (NMR) spectroscopy after basic assignment as e.g. in: V. Busico and R. Cipullo, Progress in Polymer Science, 2001, 26, 443-533. Experimental parameters are adjusted to ensure measurement of quantitative spectra for this specific task as e.g in: S. Berger and S. Braun, 200 and More NMR Experiments: A Practical Course, 2004, Wiley-VCH, Weinheim. Quantities are calculated using simple corrected ratios of the signal integrals of representative sites in a manner known in the art. The isotacticity is determined at the pentad level i.e. mmmm fraction of the pentad distribution.

2,1-Propylene Insertions

The relative amount of 2,1-insertions of propylene monomers in the chain was determined by $^{13}$C-NMR spectroscopy and calculated as described in EP 0 629 632 B1.

Randomness

In the FTIR measurements, films of 250-mm thickness were compression moulded at 225° C. and investigated on a Perkin-Elmer System 2000 FTIR instrument. The ethylene peak area (760-700 cm$^{-1}$) was used as a measure of total ethylene content. The absorption band for the structure -P-E-P- (one ethylene unit between propylene units), occurs at 733 cm$^{-1}$. This band characterizes the random ethylene content. For longer ethylene sequences (more than two units), an absorption band occurs at 720 cm$^{-1}$. Generally, a shoulder corresponding to longer ethylene runs is observed for the random copolymers. The calibration for total ethylene content based on the area and random ethylene (PEP) content based on peak height at 733 cm$^{-1}$ was made by $^{13}$C-NMR. (Thermochimica Acta, 66 (1990) 53-68).

$$\text{Randomness}=\text{random ethylene (-P-E-P-) content/the total ethylene content} \times 100\%.$$

Number average molecular weight ($M_n$), weight average molecular weight ($M_w$) and molecular weight distribution (MWD) are determined by size exclusion chromatography (SEC) using Waters Alliance GPCV 2000 instrument with online viscometer. The oven temperature is 140° C. Trichlorobenzene is used as a solvent (ISO 16014).

MFR$_2$ (230° C.) is measured according to ISO 1133 (230° C., 2.16 kg load).

Quantification of Comonomer Content by FTIR Spectroscopy

Quantitative infrared (IR) spectroscopy was used to quantify the amount of comonomer. Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature. The amount of comonomer (N) was determined as weight percent (wt %) via:

$$N=k1(A/R)+k2$$

where A is the maximum absorbance defined of the comonomer band, R the maximum absorbance defined as peak height of the reference peak and with k1 and k2 the linear constants obtained by calibration.

For poly(ethylene-co-propene-co-butene) (EPB) systems quantification was achieved via two characteristic absorbance bands:
- 1-butene content via 760 cm$^{-1}$ (linear baseline correction between 750 to 810 cm$^{-1}$)
- ethylene content via 720 cm$^{-1}$ or 730 cm$^{-1}$ (linear baseline correction between 710 to 750 cm$^{-1}$)

The band used for ethane content quantification is selected depending if the ethylene content is random (730 cm$^{-1}$) or block-like (720 cm$^{-1}$). The absorbance at 4324 cm$^{-1}$ was used as a reference band.

The amount of comonomer (N) as determined as mole percent (mol %) was obtained by conversion from units of weight percent (wt %) through use of the molecular weight (Mw) of the comonomer:

$$NA[\text{mol \%}]=(NA[\text{wt \%}]/MwA)/((NA[\text{wt \%}]/MwA)+ (NB[\text{wt \%}]/MwB)+((100[\text{wt \%}]-NA[\text{wt \%}]-NB[\text{wt \%}])/MwC))$$

Solid-state infrared spectra were recorded using a FTIR spectrometer on compression molded thin (100-800 μm) films at a resolution of 4 cm$^{-1}$ and analysed in transmission mode.

Quantification of Comonomer Content by $^{13}$C NMR Spectroscopy

The comonomer content was determined by quantitative nuclear magnetic resonance (NMR) spectroscopy after basic assignment (e.g. "NMR Spectra of Polymers and Polymer Additives", A. J. Brandolini and D. D. Hills, 2000, Marcel Dekker, Inc. New York). Experimental parameters were adjusted to ensure measurement of quantitative spectra for this specific task (e.g. "200 and More NMR Experiments: A Practical Course", S. Berger and S. Braun, 2004, Wiley-VCH, Weinheim). Quantities were calculated using simple corrected ratios of the signal integrals of representative sites in a manner known in the art.

Tensile Modulus of the polymers is evaluated according to ISO 527-1 (cross head speed=1 mm/min; 23° C.) using injection molded specimens as described in EN ISO 1873-2 (dog bone shape, 4 mm thickness).

Melting Temperature Tm

Melting temperature (peak temperature) Tm was measured by DSC according to ISO 11357-1 using the peak temperature in the second heat in a heat-cool-heat cycle with a rate of 10 K/min between ambient temperature and 210° C.

The melt enthalpy (Hm) [heat of fusion] was measured by the DSC method according to ISO 11357-3.

Crystallinity

The crystallinity of the polymers were calculated from the melting enthalpy Hm in a standard differential scanning calorimetry (DSC) experment according to ISO 3146 running at a heating rate of 10K/min and assuming a melting enthalpy of 209 J/g for a completely crystalline propylene homopolymer (see e.g. the following reference: Markus Gahleitner, Pirjo Jääskeläinen, Ewa Ratajski, Christian Paulik, Jens Reussner, Johannes Wolfschwenger & Wolfgang Neissl, Propylene-Ethylene Random Copolymers: Comonomer Effects on Crystallinity and Application Properties, J. Appl.Polym.Sci. 95 (2005) 1073-81).

The xylene solubles (XCS, wt.-%): Content of Xylene solubles (XCS) is determined at 23° C. according ISO 6427.

Grammage of the Web

The unit weight (grammage) of the webs in g/m$^2$ was determined in accordance with ISO 536:1995.

Average Fiber Diameter in the Web

The number average fiber diameter was determined using scanning electron microscopy (SEM). A representative part of the web was selected and an SEM micrograph of suitable magnification was recorded, then the diameter of 20 fibers was measured and the number average calculated.

Tensile Properties of the Web

The tensile strength of the webs was determined in alignment to ISO 527-1 on rectangular specimens cut from the web having 50 mm width and 140 mm length with an effective clamping length of 100 mm using a Zwick 005 tensile tester. The test temperature was +23±2° C. and a testing speed of 100 mm/min was used up to the breakage point, extension being measured by distance of clamps based on initial distance of clamps. 10 samples were tested from which an average curve of force vs. extension was calculated (see FIGS. 1 and 2). From these average curves the tensile strength was determined as the maximum force reached, the tensile strain as the extension at tensile strength, the breakage force as the force at the breakage point and the breakage strain as the extension at breakage point.

2. Preparation of the Examples 2.1 Preparation of the Polymers

Inventive Example

The commercial ethylene-propylene random copolymer RF365MO (Borealis) polymerized using a commercial 4$^{th}$ generation Ziegler-Natta catalyst having an MFR$_2$ of 22 g/10 min and an ethylene content as determined by FTIR of 3.3 wt % was used as a starting material for visbreaking. The visbreaking was performed in a co-rotating twin-screw extruder at 200-230° C. using an appropriate amount of (tert.butylperoxy)-2,5-dimethylhexane (Trigonox 101, distributed by Akzo Nobel, Netherlands) to achieve an MFR$_2$ of 800 g/10 min. The resulting polymer is characterized by a melting point of 145° C. and a heat of fusion of 100.1 J/g as determined by DSC, a crystallinity of 48%, a tensile modulus of 900 MPa as determined on injection-molded specimens, and an XCS content of 4.1 wt %. No 2,1-insertions of propylene monomers in the chain are detectable by $^{13}$C-NMR spectroscopy. The molecular weight distribution of this polymer as determined by SEC is characterized by a weight average molecular weight Mw of 81 kg/mol and a broadness Mw/Mn of 2.6.

Comparative Example

The commercial propylene homopolymer Borflow™ HL508FB (Borealis) having an MFR$_2$ of 800 g/10 min produced in a visbreaking process was used. This polymer is characterized by a melting point of 161° C. and a heat of fusion of 102.4 J/g as determined by DSC, a crystallinity of 49%, a tensile modulus of 1100 MPa as determined on injection-molded specimens, and an XCS content of 1.9 wt %. The molecular weight distribution of this polymer as determined by SEC is characterized by a weight average molecular weight Mw of 77 kg/mol and a broadness Mw/Mn of 3.0.

2.2 Preparation of Melt Blown Fibers

The materials have been converted into melt blown webs on a 250 mm wide Reicofil melt blown pilot line using a die with holes of 0.4 mm diameter and 35 holes per inch. The melt temperature was set at 290° C. and the air temperature at 270° C. The output of the line was 30 kg/m/h, the distance from die to collector was fixed at 500 mm and the webs produced had a weight of 120 g/m$^2$. For the polymers webs were produced with two different air volumes being: 100 m$^3$/h (=low air volume) and the maximum air volume. The maximum air volume can be described as the air volume where fly formation is starting. The setting with maximum air volume has been repeated with the addition of water quench. The water quench was applied via standard nozzles which were located 150 mm under the die. The amount of water sprayed was adjusted in that way that the web arriving at the winder was cooled till room temperature and slightly feeling wet.

2.3 Sample Preparation and Testing

The unit weight of the webs was determined parallel to the production, and a unit weight of 120 g/m$^2$ was achieved by proper machine adjustment in all cases. The tensile properties of the webs were tested twice, 1 hour after production and after being conditioned for one week at 23° C.+/−2° C.

The tables below show advantages in both tensile and breakage parameter for the inventive material at all conditions of web production both before and after conditioning/ageing.

TABLE 1

| | | 1 hour after production | | | |
|---|---|---|---|---|---|
| | Web production | Tensile strength N | Tensile Strain % | Breakage strength N | Breakage strain % |
| E1 (RACO-MB) | Low air flow | 42 | 9.7 | 41.5 | 10 |
| | High air flow | 42 | 21 | 40.5 | 24 |
| | High air + water | 41 | 57 | 32 | 62 |
| C1 (HL508FB) | Low air flow | 34 | 8 | 31 | 9 |
| | High air flow | 19 | 12 | 9.5 | 20 |
| | High air + water | 18 | 11 | 9 | 18.5 |

TABLE 2

| | | 1 week after production | | | |
|---|---|---|---|---|---|
| | Web production | Tensile strength [N] | Tensile Strain [%] | Breakage strength [N] | Breakage strain [%] |
| E1 (RACO-MB) | Low air flow | 44.5 | 7 | 44 | 7.3 |
| | High air flow | 44.5 | 20 | 36 | 25 |
| | High air + water | 43 | 51 | 40 | 55 |
| C1 (HL508FB) | Low air flow | 34.5 | 5.8 | 34 | 6.2 |
| | High air flow | 20 | 12 | 10 | 18.5 |
| | High air + water | 18.5 | 10.5 | 19.5 | 9.2 |

We claim:

1. Melt-blown fiber having an average diameter of not more than 5.0 μm, said fiber comprises at least 85 wt.-% of a propylene copolymer, wherein said propylene copolymer is the only polymer in the melt-blown fiber,
and wherein further
(a) said melt blown fiber and/or said propylene copolymer has/have a melt flow rate $MFR_2$ (230° C.) measured according to ISO 1133 of at least 200 g/10 min,
(b) said propylene copolymer has a comonomer content of 0.5 to 5.5 wt.-%, the comonmers are ethylene and/or at least one $C_4$ to $C_{20}$ α-olefin selected from the group consisting of 1-butene, 1-pentene, 1-hexene, 1-heptene, and 1-octene,
(c) the propylene copolymer has <2,1> regiodefects of not more than 0.1 mol.-% determined by $^{13}C$-spectroscopy, and
(d) said melt blown fiber and/or said propylene copolymer fulfill(s) the equation (1)

$$\frac{Tm[°C.]}{[°C.]} \geq 160 - \frac{C2[wt\%] \times 5.25}{[wt\%]} \quad (1)$$

wherein
Tm [° C.] is the melting temperature [given in ° C.] of said melt blown fiber and/or of said propylene copolymer measured according to ISO 11357-3,
C2 [wt %] is the amount [given in weight percentage] of comonomers within said melt blown fiber and/or within said propylene copolymer determined with Fourier transform infrared spectroscopy (FTIR).

2. Melt blown fiber according to claim 1, wherein said propylene copolymer and/or said melt blown fiber has a melting temperature of at least 140° C.

3. Melt blown fiber according to claim 1, wherein the fiber comprises at least 90 wt.-% of the propylene copolymer.

4. Melt blown fiber according to claim 1, wherein the pentad isotacticity of the propylene copolymer is higher than 95 mol.-% determined with $^{13}C$ NMR spectroscopy.

5. Melt blown fiber according to claim 1, wherein the propylene copolymer has a molecular weight distribution $(M_w/M_n)$ of 2.0 to 6.0.

6. Melt blown fiber according to claim 1, wherein the propylene copolymer has been visbroken with a visbreaking ratio [final $MFR_2$ (230° C.)/initial $MFR_2$ (230° C.)] of 5.0 to 100.0, wherein
"initial $MFR_2$ (230° C.)" is the $MFR_2$ (230° C.) of the propylene copolymer before visbreaking and
"final $MFR_2$ (230° C.)" is the $MFR_2$ (230° C.) of the propylene copolymer (R-PP) after visbreaking.

7. Melt blown fiber according to claim 1, wherein the melt blown fiber and/or the propylene copolymer fulfill(s) the equation (2)

$$\frac{TM[MPa]}{[MPa]} \geq 1200 - \frac{C2[wt\%] \times 145}{[wt\%]} \quad (2)$$

wherein
TM [MPa] is the tensile modulus [given in MPa] of said melt blown fiber and/or of said propylene copolymer measured according to ISO 527-3 using injection molded specimen as described in EN ISO 1873-2 (dog bone shape, 4 mm thickness),
C2 [wt %] is the amount [given in weight percentage] of comonomers, within said melt blown fiber and/or within said propylene copolymer determined with Fourier transform infrared spectroscopy (FTIR).

8. Melt blown fiber according to claim 1, wherein the melt blown fiber and/or the propylene copolymer has/have a tensile modulus measured according to ISO 527-3 using injection molded specimen as described in EN ISO 1873-2 (dog bone shape, 4 mm thickness) of at least 850 MPa.

9. Melt blown fiber according to claim 1, wherein the melt blown fiber has been cooled by water quenching.

10. Melt blown fiber according to claim 1, wherein said melt blown fiber is formed into a melt blown web comprising said melt blown fibers.

11. Melt blown fiber according to claim 10, wherein said melt blown web has a tensile strength
(a) of at least 35 N measured 1 h after production of the melt blown web according to ISO 527-1 on rectangular specimens cut from the web having 50 mm width and 140 mm length at a temperature of +23±2° C. and a testing speed of 100 mm/min and/or
(b) of at least 36 N measured 168 h after production of the melt blown web according to ISO 527-1 on rectangular specimens cut from the web having 50 mm width and 140 mm length at a temperature of +23±2° C. and a testing speed of 100 mm/min.

12. Melt blown fiber according to claim 10, wherein said propylene copolymer is melt blown by using a melt blown plant having a die with holes of 0.3 to 0.5 mm diameter and 10 to 16 holes per cm for the preparation of said melt blown web.

13. Melt blown fiber according to claim 1, wherein said melt blown fiber is formed into an article comprising said melt blown fiber, said article is selected from the group consisting of filtration medium, diaper, sanitary napkin, panty liner, incontinence product for adults, protective clothing, surgical drape, surgical gown, and surgical wear.

14. Melt blown fiber according to claim 1, wherein said melt blown fiber is formed into an article comprising a melt blown web comprising said melt blown fiber, said article is selected from the group consisting of filtration medium, diaper, sanitary napkin, panty liner, incontinence product for adults, protective clothing, surgical drape, surgical gown, and surgical wear.

15. Melt blown fiber according to claim 13, wherein said article further comprises a spunbonded fabric.

16. Melt blown fiber according to claim 14, wherein said article further comprises a spunbonded fabric.

17. An article comprising,
a spunbonded fabric, and
a melt-blown fiber having an average diameter of not more than 5.0 μm, said fiber comprises at least 85 wt.-% of a propylene copolymer, wherein said propylene copolymer is the only polymer in the melt-blown fiber,
and wherein further
(a) said melt blown fiber and/or said propylene copolymer has/have a melt flow rate $MFR_2$ (230° C.) measured according to ISO 1133 of at least 200 g/10 min,
(b) said propylene copolymer has a comonomer content of 0.5 to 5.5 wt.-%, the comonmers are ethylene and/or at least one $C_4$ to $C_{20}$ α-olefin selected from the group consisting of 1-butene, 1-pentene, 1-hexene, 1-heptene, and 1-octene,
(c) the propylene copolymer has <2,1> regiodefects of not more than 0.1 mol.-% determined by $^{13}C$-spectroscopy, and
(d) said melt blown fiber and/or said propylene copolymer fulfill(s) the equation (1)

$$\frac{Tm[°\ C.]}{[°\ C.]} \geq 160 - \frac{C2[wt\ \%] \times 5.25}{[wt\ \%]} \qquad (1)$$

wherein
Tm [° C.] is the melting temperature [given in ° C.] of said melt blown fiber and/or of said propylene copolymer measured according to ISO 11357-3, C2 [wt %] is the amount [given in weight percentage] of comonomers within said melt blown fiber and/or within said propylene copolymer determined with Fourier transform infrared spectroscopy (FTIR).

18. Process for the preparation of melt blown fibers, comprising:
providing a propylene copolymer, wherein
(a) said propylene copolymer has a melt flow rate $MFR_2$ (230° C.) measured according to ISO 1133 of at least 200 g/10 min,
(b) said propylene copolymer has a comonomer content of 0.5 to 5.5 wt.-%, the comonmers are ethylene and/or at least one $C_4$ to $C_{20}$ α-olefin selected from the group consisting of 1-butene, 1-pentene, 1-hexene, 1-heptene, and 1-octene,
(c) the propylene copolymer has <2,1> regiodefects of not more than 0.1 mol.-% determined by $^{13}C$-spectroscopy, and
(d) said propylene copolymer fulfill(s) the equation (1)

$$\frac{Tm[°\ C.]}{[°\ C.]} \geq 160 - \frac{C2[wt\ \%] \times 5.25}{[wt\ \%]} \qquad (1)$$

wherein
Tm [° C.] is the melting temperature [given in ° C.] of said propylene copolymer measured according to ISO 11357-3,
C2 [wt %] is the amount [given in weight percentage] of comonomers within said melt propylene copolymer determined with Fourier transform infrared spectroscopy (FTIR),
melt blowing said propylene copolymer by using a melt blown plant having a die with holes of 0.3 to 0.5 mm diameter and 10 to 16 holes per cm to obtain melt-blown fibers having an average diameter of not more than 5.0 μm, said fiber comprising at least 85 wt.-% of said propylene copolymer, wherein said propylene copolymer is the only polymer in the melt-blown fiber.

* * * * *